United States Patent
Simon et al.

(10) Patent No.: US 10,286,930 B2
(45) Date of Patent: May 14, 2019

(54) INSTRUMENTED RAIL SYSTEM

(71) Applicant: The Johns Hopkins University, Baltimore, MD (US)

(72) Inventors: Daniel H. Simon, Eldersburg, MD (US); Benjamin B. Alvarez, Hanover, MD (US); William A. Irizarry-Cruz, Odenton, MD (US); Todd M. Gustafson, West Friendship, MD (US); Abraham Rajan, Laurel, MD (US); Frederick Warren LeBlanc, Coconut Creek, FL (US); Warren E. Zander, Millersville, MD (US)

(73) Assignee: The Johns Hopkins University, Baltimore, MD (US)

( * ) Notice: Subject to any disclaimer, the term of this patent is extended or adjusted under 35 U.S.C. 154(b) by 369 days.

(21) Appl. No.: 15/090,636

(22) Filed: Apr. 5, 2016

(65) Prior Publication Data
US 2016/0368510 A1    Dec. 22, 2016

Related U.S. Application Data

(60) Provisional application No. 62/180,089, filed on Jun. 16, 2015.

(51) Int. Cl.
*B61D 15/12* (2006.01)
*B61L 23/04* (2006.01)
(Continued)

(52) U.S. Cl.
CPC ............ *B61D 15/12* (2013.01); *B61K 9/08* (2013.01); *B61L 15/009* (2013.01);
(Continued)

(58) Field of Classification Search
CPC ...... B61L 23/04; B61L 23/041; B61L 23/044; B61L 23/047; B61L 23/048; B61L 15/0081; B61K 9/08; B61D 15/08; B61D 15/12
(Continued)

(56) References Cited

U.S. PATENT DOCUMENTS

| 4,578,665 A | | 3/1986 | Yang |
| 5,429,329 A | * | 7/1995 | Wallace ............... B61L 23/041 246/121 |

(Continued)

FOREIGN PATENT DOCUMENTS

| KR | 2018013310 | * | 2/2018 | ............ B61D 15/08 |
| WO | WO 2012040794 | * | 4/2012 | ............ B61L 23/041 |
| WO | WO 2015140263 | * | 9/2015 | ............ B61D 15/08 |

OTHER PUBLICATIONS

Zander, Warren E., "Rail Tunnel Sensor System (RTSS)" presentation given to various rail system industry orgainizations, Apr. 25, 2012, pp. 1-4.

Primary Examiner — Zachary L Kuhfuss
(74) Attorney, Agent, or Firm — Noah J. Hayward

(57) ABSTRACT

A deployable vehicle for an instrumented rail system includes a first locomotion module having a first mobility assembly configured to engage a first rail, a second locomotion module having a second mobility assembly configured to engage a second rail, an adjustable frame extendable between the first and second locomotion modules by a distance corresponding to the distance between the first and second rails, and a sensor module removably attachable to the frame. The sensor module includes a sensor suite having a plurality of sensors for gathering data while the vehicle is deployed. The sensor module includes a communications module having a first radio configured to enable the vehicle to establish at least a first communication link with a
(Continued)

remotely located mobile base station, and a second radio configured to establish a second communication link with the remotely located mobile base station.

20 Claims, 6 Drawing Sheets

(51) Int. Cl.
H04N 5/247 (2006.01)
B61K 9/08 (2006.01)
B61L 15/00 (2006.01)
B61L 25/02 (2006.01)
B61L 27/00 (2006.01)

(52) U.S. Cl.
CPC ....... B61L 15/0027 (2013.01); B61L 15/0081 (2013.01); B61L 23/04 (2013.01); B61L 23/041 (2013.01); B61L 23/044 (2013.01); B61L 23/045 (2013.01); B61L 23/047 (2013.01); B61L 23/048 (2013.01); B61L 25/025 (2013.01); B61L 27/0077 (2013.01); B61L 27/0088 (2013.01); H04N 5/247 (2013.01)

(58) Field of Classification Search
USPC .......................................... 105/26.1, 27, 162
See application file for complete search history.

(56) References Cited

U.S. PATENT DOCUMENTS

| | | | |
|---|---|---|---|
| 5,623,244 A * | 4/1997 | Cooper | B61L 23/041 246/166 |
| 5,786,750 A | 7/1998 | Cooper | |
| 6,349,653 B1 | 2/2002 | Siedlarczyk | |
| 6,417,765 B1 * | 7/2002 | Capanna | B61L 23/041 246/166 |
| 6,476,603 B2 * | 11/2002 | Clark | B61D 15/00 324/217 |
| 6,565,046 B2 | 5/2003 | Uebel | |
| 6,831,573 B2 * | 12/2004 | Jones | B61L 23/041 340/436 |
| 6,854,691 B2 * | 2/2005 | Kraeling | B61L 3/127 246/167 R |
| 7,513,463 B2 | 4/2009 | Rossmann et al. | |
| 7,543,664 B2 | 6/2009 | Nelson | |
| 7,729,818 B2 * | 6/2010 | Wheeler | B61L 3/127 246/167 R |
| 7,999,848 B2 | 8/2011 | Chew | |
| 8,081,320 B2 * | 12/2011 | Villar | B61K 9/08 238/264 |
| 8,365,604 B2 * | 2/2013 | Kahn | G01N 29/07 73/636 |
| 8,806,948 B2 * | 8/2014 | Kahn | G01N 29/265 73/634 |
| 9,562,878 B2 * | 2/2017 | Graham | G01N 29/04 |
| 9,804,577 B1 * | 10/2017 | Troy | G05B 15/02 |
| 2004/0240975 A1 | 12/2004 | Baraggioli | |
| 2007/0216771 A1 | 9/2007 | Kumar | |
| 2010/0076631 A1 | 3/2010 | Mian | |
| 2012/0192756 A1 * | 8/2012 | Miller | B61K 9/08 104/2 |
| 2012/0274772 A1 * | 11/2012 | Fosburgh | B61K 9/08 348/149 |
| 2014/0142868 A1 * | 5/2014 | Bidaud | G01N 21/8803 702/40 |
| 2016/0282314 A1 * | 9/2016 | Hupkau | G01N 29/043 |
| 2017/0305442 A1 * | 10/2017 | Viviani | B61D 15/12 |
| 2018/0065762 A1 * | 3/2018 | Georgeson | B64F 5/60 |

* cited by examiner

INSTRUMENTED RAIL SYSTEM

CROSS-REFERENCE TO RELATED APPLICATIONS

This application claims priority to and the benefit of U.S. Provisional Application No. 62/180,089 filed on Jun. 16, 2015, the entire contents of which are hereby incorporated herein by reference.

STATEMENT OF GOVERNMENT INTEREST

This invention was made with Government support under contract numbers N00024-03-D-6606 and N00024-13-D-6400 awarded by the Naval Sea Systems Command (NAVSEA). The Government has certain rights in the invention.

TECHNICAL FIELD

Exemplary embodiments of the present disclosure generally relate to security, safety and maintenance monitoring technology, and more specifically relate to a system for a portable unmanned vehicle that can be utilized on passenger or freight rail systems to monitor railway environments.

BACKGROUND

The inspection, evaluation and protection of critical infrastructure along railroad right-of-ways are necessary operations for a secure rail system. Tunnels, bridges, rail yards and track beds may each introduce critical security concerns, and may require frequent maintenance. U.S. railway companies and transit systems typically employ security measures, but are not able to adequately cover over 160,000 miles of domestic rail, including more than 210 transit tunnels.

This complex and extensive critical infrastructure provides innumerable targets for terrorists, and creates infinite safety and maintenance issues. Rail incidents are capable of impacting large communities and creating major service disruptions, injury and loss of life, ultimately resulting in expensive losses, mitigation, and repair and replacement actions.

The use of unmanned vehicles could provide a tremendously cost effective solution to the current security and incident response efforts for the transportation industry or any industry that uses rail systems, while additionally facilitating maintenance activities. Thus, it may be desirable to define a system and devices that can be easily deployable to gather data in remote locations associated with a rail system. However, such devices must be robust in terms of both their data gathering and communication capabilities, while remaining flexible enough to maximize their ability to be deployed.

BRIEF SUMMARY OF SOME EXAMPLES

Some example embodiments of unmanned vehicles may enable the provision of a system capable of deployment in rail system environments to allow the system to be utilized for safety, security, inspections and maintenance operations. In this regard, for example, an instrumented rail system (IRiS) of an example embodiment would enable a two-person team to transport the IRiS to locations for aboveground or tunnel applications. The IRiS has a modular design to facilitate transport and easy assembly without loose hardware. After assembly and deployment of the IRiS, the team can control the IRiS remotely and obtain information therefrom using redundant communication channels as described herein.

In one example embodiment, a deployable vehicle of an instrumented rail system is provided. The vehicle includes a first locomotion module having a first mobility assembly configured to engage a first rail, a second locomotion module having a second mobility assembly configured to engage a second rail, an adjustable frame extendable between the first and second locomotion modules by a distance corresponding to the distance between the first and second rails, and a sensor module removably attachable to the frame. The sensor module includes a sensor suite having a plurality of sensors for gathering data while the vehicle is deployed. The sensor module includes a communications module having a first radio configured to enable the vehicle to establish at least a first communication link with a remotely located mobile base station, and a second radio configured to establish a second communication link with the remotely located mobile base station (e.g., simultaneously or in response to a loss of the first communication link).

In another example embodiment, an instrumented rail system is provided. The system may include a mobile base station and a deployable vehicle. The deployable vehicle includes a first locomotion module having a first mobility assembly configured to engage a first rail, a second locomotion module having a second mobility assembly configured to engage a second rail, an adjustable frame extendable between the first and second locomotion modules by a distance corresponding to the distance between the first and second rails, and a sensor module removably attachable to the frame. The sensor module includes a sensor suite having a plurality of sensors for gathering data while the vehicle is deployed. The sensor module includes a communications module having a first radio configured to enable the vehicle to establish at least a first communication link with the mobile base station, and a second radio configured to establish a second communication link with the mobile base station (e.g., simultaneously or in response to a loss of the first communication link).

BRIEF DESCRIPTION OF THE SEVERAL VIEWS OF THE DRAWING(S)

Having thus described example embodiments of the invention in general terms, reference will now be made to the accompanying drawings, which are not necessarily drawn to scale, and wherein:

Figure 5A:
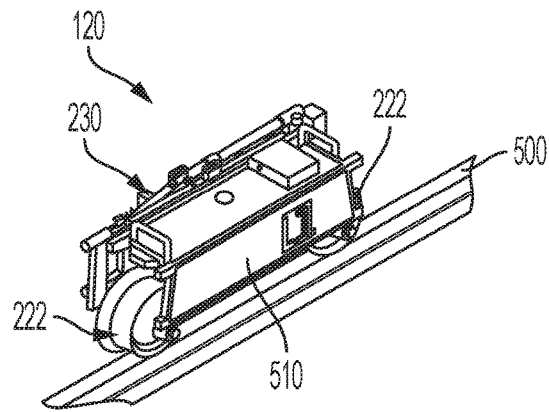
Figure 5B:
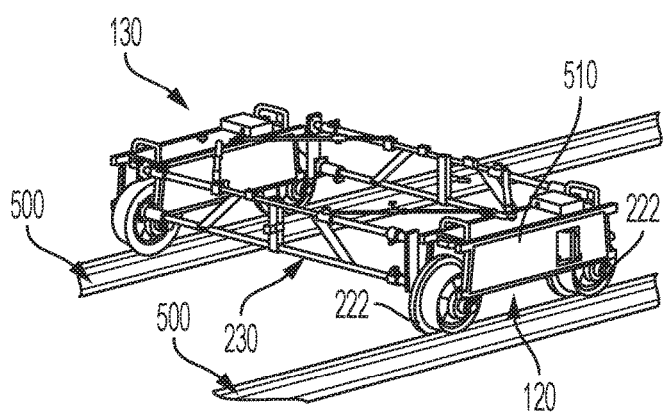
Figure 5C:
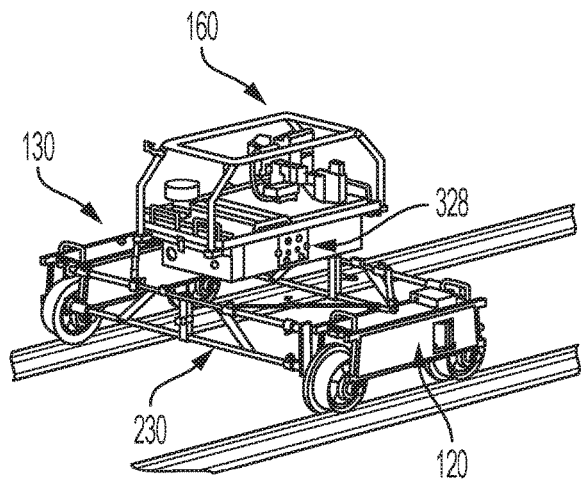
Figure 6:
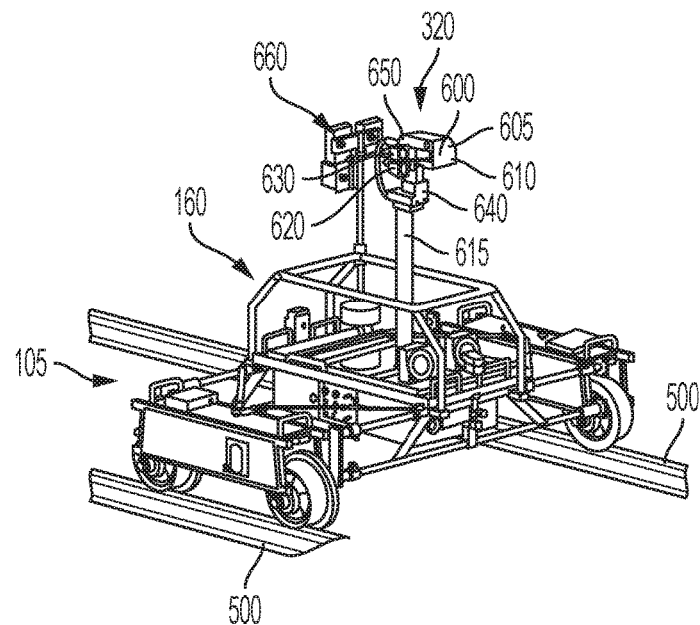
Figure 7B:
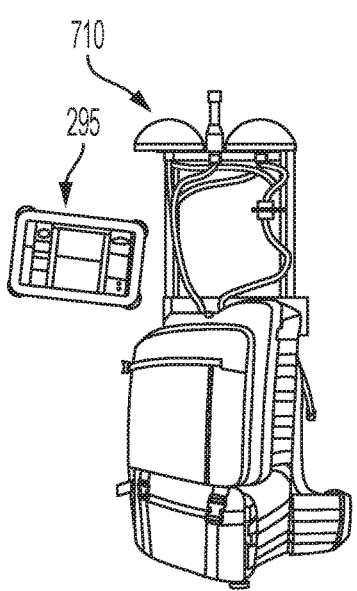
Figure 7A:
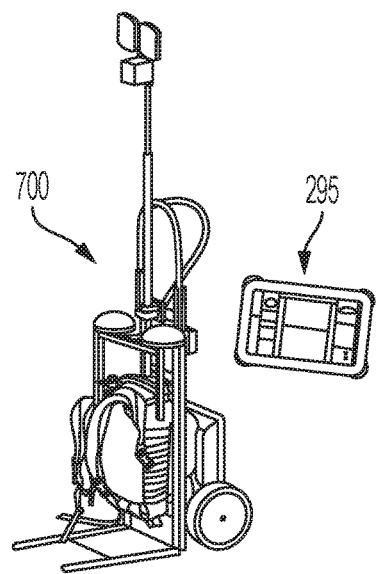

FIG. 5, which includes FIGS. 5A, 5B and 5C, illustrates stages of assembly of a deployable vehicle of the system in accordance with an example embodiment;

FIG. 6 illustrates a perspective view of a deployed vehicle of the system in accordance with an example embodiment; and FIG. 7, which includes FIGS. 7A and 7B, illustrates a base station in stationary and mobile configurations in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

As mentioned above, in rail environments, certain operator challenges may exist, and the amount of area to be covered is immense. Thus, a mobile and deployable system can be advantageous. Some example embodiments may facilitate safe and easy deployment and operation of the IRiS at any rail location under a wide range of environmental conditions. Some example embodiments may further support fixed or moving audiovisual surveillance of activities in the vicinity of accessible railway tracks of any gauge. Some example embodiments may facilitate two-way, redundant communication with transit/security staff, railway passengers, or unauthorized in the vicinity of the system. Example embodiments can monitor, report and record location, health and status of the IRiS along with other data gathered in the vicinity of the IRiS. Example embodiments can therefore support unique monitoring and inspection tasks required by individual transit systems. Some example embodiments may also facilitate autonomous locomotion and data collection with or without real-time communication to operators.

Figure 1:
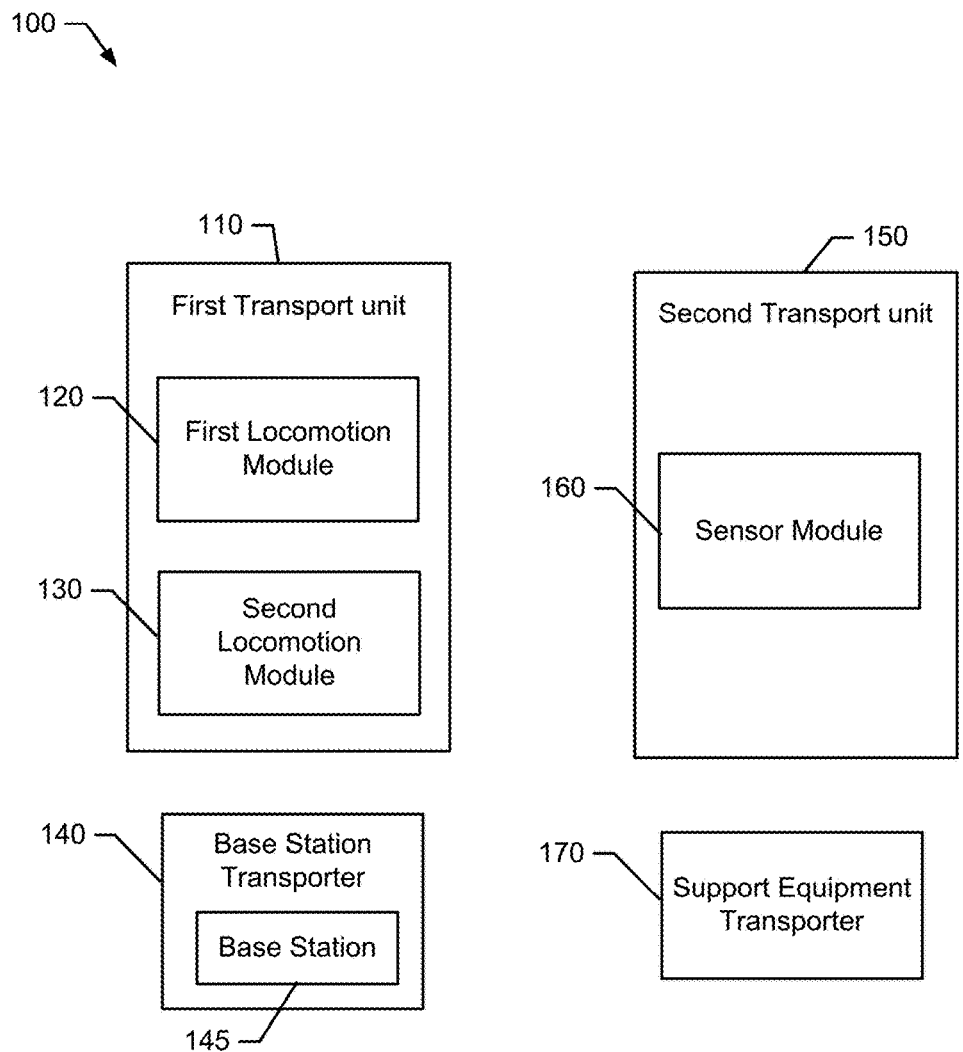
FIG. 1 illustrates a block diagram showing components of an instrumented rail system in a transport mode in accordance with an example embodiment.
Figure 2:
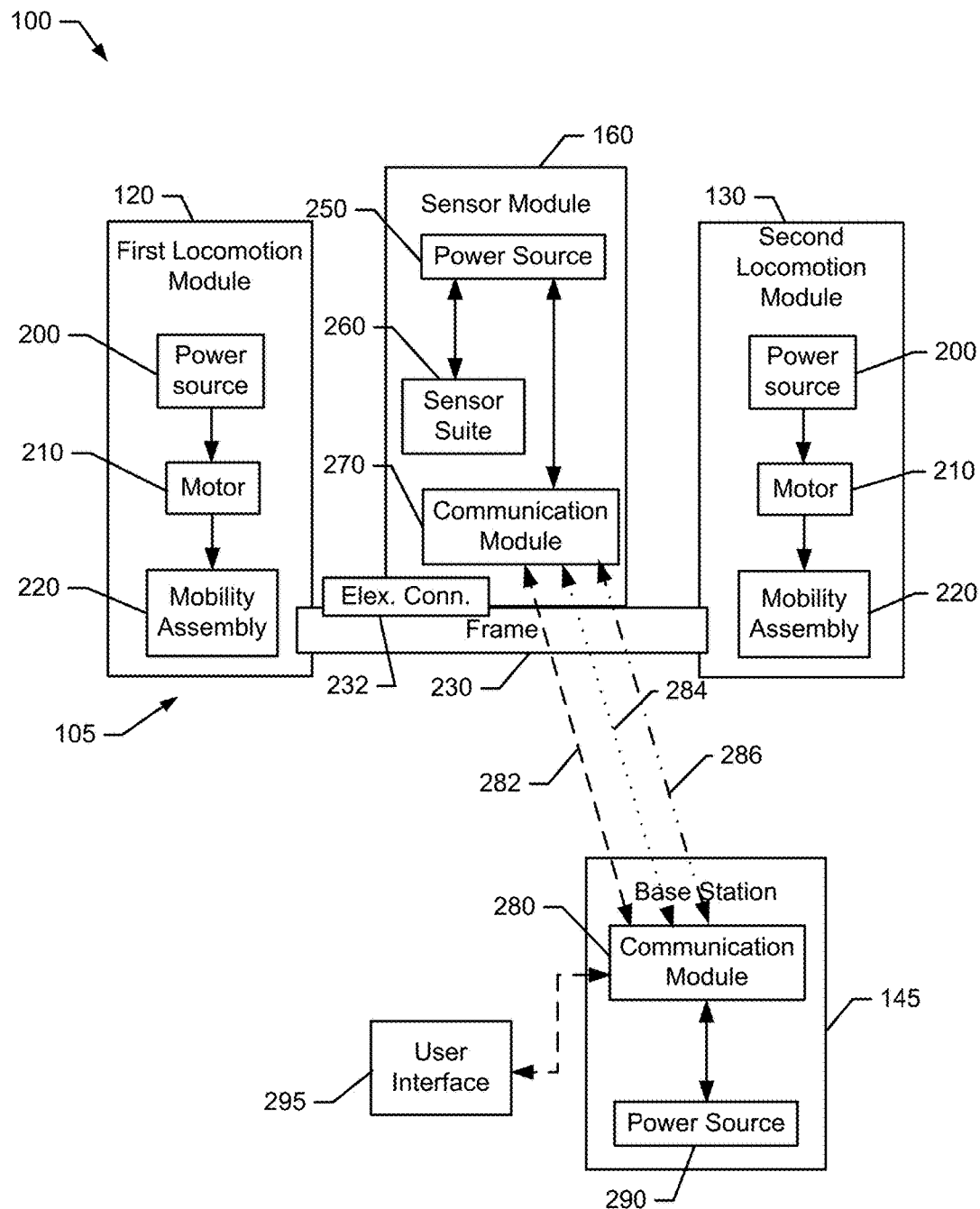
FIG. 2 illustrates a block diagram showing components of the instrumented rail system in a deployed mode in accordance with an example embodiment.

The IRiS may be a deployable system, and therefore the IRiS may have a transport mode and a deployed mode. FIGS. 1 and 2 each illustrate a block diagram showing components of a system 100 (e.g., the IRiS) configured to facilitate achievement of the functions and advantages described above in accordance with an example embodiment. In this regard, FIG. 1 shows the IRiS in the transport mode, and FIG. 2 illustrates the IRiS in the deployed mode.

As shown in FIG. 1, the system 100 may include a first transport unit 110. The first transport unit 110 may include or otherwise be configured to facilitate transport of a first locomotion module 120 and a second locomotion module 130. The first transport unit 110 may be a rolling cart in some cases. Thus, the first transport unit 110 may include rubber wheels and a frame upon which the first and second locomotion modules 120 and 130 may be mounted. In some cases, the first transport unit 110 may include straps to enable the first and second locomotion modules 120 and 130 to be affixed to the frame.

In some cases, the system 100 may further include a base station transporter 140. The base station transporter 140 may be used to facilitate transport of a base station 145. The base station transporter 140 may be a backpack in some cases. However, in other examples, the base station transporter 140 may be its own cart, or the base station transporter 140 may be a container that can be attached to the first transport unit 110 (or second transport unit 150).

The second transport unit 150 may include or otherwise be configured to facilitate transport of a sensor module 160. The second transport unit 150 may be a rolling cart in some cases. Thus, the second transport unit 150 may include rubber wheels and a frame upon which the sensor module 160 may be mounted. In some cases, the second transport unit 150 may include straps to enable the sensor module 160 to be affixed to the frame.

If additional support equipment is required or desired, such additional support equipment may be provided in a support equipment transporter 170. In some cases, the support equipment transporter 170 may be a backpack. However, in other examples, the support equipment transporter 170 may be its own cart, or the support equipment transporter 170 may be a container that can be attached to the second transport unit 150 (or the first transport unit 110).

The first transport unit 110 may be pulled (or pushed) by a first operator to a desired location for deployment of the system 100 into the deployed mode. The second transport unit 150 may be pulled (or pushed) by a second operator to the desired location as well. In instances where the base station transporter 140 and the support equipment transporter 170 are embodied as backpacks, the first and second operators may each wear one of the backpacks to transport the corresponding backpacks to the desired location.

Once the desired location is reached, the system 100 may be setup in the deployed mode. FIG. 2 illustrates a block diagram of various components of the system 100 in the deployed mode. Referring now to FIG. 2, the first locomotion module 120 and the second locomotion module 130 may each include instances of a power source 200, a motor 210, and a mobility assembly 220. The power source 200 may be a battery, and the motor 210 may be an electric motor. However, it is possible that other power sources and locomotion sources may be employed in other cases. For example, solar power, gasoline engines, and/or the like could be substituted in some cases.

In some cases, a single battery could power both the first and second locomotion modules 120 and 130. In such cases, a frame 230 extending between the first and second locomotion modules 120 and 130 may operably couple the first and second locomotion modules 120 and 130, and enable power from the power source 200 to power the motors 210 of each of the first and second locomotion modules 120 and 130. In still other examples, a single motor may be employed and the mobility assembly 220 of one of the first and second locomotion modules 120 and 130 may be powered, while the other freewheels.

The mobility assembly 220 of each of the first and second locomotion modules 120 and 130 may be rail wheels that are adapted to riding on rail tracks. Thus, for example, each instance of the mobility assembly 220 may include two rail wheels that each have a beveled rim having a flange on the interior portion of the rail wheels such the that vehicle self-centers on the track. In some cases, the rail wheels may be made of aluminum or a similar metallic material. One or both of the rail wheels of the mobility assembly 220 may be operably coupled to the motor 210 to receive power therefrom.

The frame 230 may be extendable between the first and second locomotion modules 120 and 130 based on operator action. In some cases, the frame 230 may be operably coupled to one of the first and second locomotion modules 120 and 130 to allow extension of the frame 230 to the other of the first and second locomotion modules 120 and 130. However, in other cases, the frame 230 may be a separate component that is operably coupled to each of the first and second locomotion modules 120 and 130. In still other examples, portions of the frame 230 may be associated with each of the first and second locomotion modules 120 and 130 so that each portion is required to be operably coupled to the respective other one of the first and second locomotion modules 120 and 130. Thus, for example, the operator may perform the needed manual activities to operably couple the first and second locomotion modules 120 and 130 to each other via the frame 230.

In some example embodiments, the frame 230 may be constructed of extendible pipes or other elongated members that are configured to bear the weight of various components of the IRiS, and also functionally (and electrically) couple components. In some cases, the frame 230 may be constructed to allow the first and second locomotion modules 120 and 130 to be fixed apart from each other at a variable distance. However, in other instances, the frame 230 may be constructed to allow the first and second locomotion modules 120 and 130 to be fixed apart from each other at a plurality of selectable predetermined distances. The predetermined distances may correlate to common gauges of rail tracks that the IRiS is expected to service.

In some embodiments, the pipes or other elongated members forming the frame 230 may include electrical wiring provided therein. The electrical wiring may run between fixed connection points (e.g., electrical connections 232) provided at respective different locations on the frame 230. In an example embodiment, the electrical connections 232 may enable electrical communication between the first and second locomotion modules 120 and 130, between components of the sensor module 160, or between components of the sensor module 160 and either or both of the first and second locomotion modules 120 and 130. The mating of the sensor module 160 and/or the first and second locomotion modules 120 and 130 with the frame 230 may effectively couple each respective component electrically with any other necessary components via the electrical connections 232.

As shown in FIG. 2, the sensor module 160 may be installed onto the frame 230 generally between the first and second locomotion modules 120 and 130. The sensor module 160 may include a power source 250 (e.g., a battery) operably coupled to a sensor suite 260 and a communication module 270. In some embodiments, the sensor module 160 may be a selected one of a plurality of different interchangeable sensor modules. Each of the interchangeable sensor modules may, for example, have a different sensor suite 260. Alternatively, the sensor suite 260 may be an interchangeable component within the sensor module 160. In any case, it should be appreciated that various different sensor suites can be supported and deployed into the field to obtain data and communicate with the base station 145 while or responsive to doing so, and the sensor suites may each include different combinations of the sensors discussed herein or other desirable sensors. Moreover, since installation of the sensor module 160 completes all electrical connections needed to enable the sensor module 160 to operate, no additional cable connections or assembly is required. Instead, once the sensor module 160 is mounted on the frame 230, the sensor module 160 is fully operational. In some cases, one or more mechanical latches, snaps or clamps may be provided to complete the electrical connections or otherwise fasten the sensor module 160 to the frame 230.

The communication module 270 of the sensor module 160 may enable the sensor module 160 to wirelessly communicate with the base station 145. In this regard, the base station may include a communication module 280 powered by a power source 290 (e.g., a battery) to enable the base station 145 to wirelessly communicate with the sensor module 160. In some cases, the communication modules 270 and 280 may each include at least two radios to enable a redundant backup communication source to be provided in difficult communication environments. Thus, for example, the communication modules 270 and 280 may be enabled to communicate with each other via a first communication link 282. However, if the first communication link 282 fails or does not achieve minimum quality of service levels, then a second communication link 284 may be employed as a backup. In some cases, the first and second communication links 282 and 284 may be maintained simultaneously via two separate communication channels or frequencies of a point-to-point radio so that aggregate bandwidth of multiple links may be employed at the same time. Furthermore, in some embodiments, additional backup links (e.g., tertiary link 286 and/or other links) may be provided. Thus, for example, if the first and second communication links 282 and 284 should fail, the tertiary link 286 may be established (e.g., via a cellular network or other wireless communication means). In still other embodiments, a tethered mode of operation may be possible, where a wired or fiber optic cable connects the communication modules 270 and 280.

When fully assembled, the first and second locomotion modules 120 and 130, the frame 230, and the sensor module 160 form a deployable vehicle 105. The deployable vehicle 105 can operate remotely from the base station 145 and gather data for storage either locally at the deployable vehicle 105, remotely at the base station 145 (responsive to communication of such data back to the base station 145), or simultaneously at both the deployable vehicle 105 and at the base station 145.

The base station 145 may also include a user interface 295, which could be integrated into the base station 145. However, in some embodiments, the user interface 295 may be a separate component such as a laptop computer, a tablet, or a smart phone. The base station 145 may be worn on the back of the operator, and the user interface 295 may be handled by the operator while walking, standing, or otherwise maintaining the ability to be mobile. However, in other examples, the base station 145 may be placed in a fixed configuration while the operator may be mobile with the user interface 295 in hand. In such examples, the user interface 295 may have a wireless local area network (e.g., WiFi) or other short range connection to the base station 145.

In an example embodiment, the user interface 295 may be a touchscreen interface for enabling remote control of the sensor module 160 and/or the first and second locomotion modules 120 and 130. The user interface 295 may include a custom graphical user interface with menu options and control consoles tailored to the control needs of IRiS. The custom graphical user interface may include a tabbed interface providing easy access to various types of functionality. For example, a main tab may provide the primary interface for runtime operation, while a status tab may summarize system operating conditions. A gallery tab may be provided to enable access to archived content (e.g., videos, photos, audio files, and/or the like). An engineering tab may also be provided to enable the operator to access or input details regarding operating information. As such, the user interface 295 (or the processing circuitry thereof) may be configured to operate software having a distributed task architecture. In this regard, for example, a central computer (e.g., running Windows based software) may delegate tasks to other computers (e.g., Linux computers). Thus, the central computer can run its own task list and use the Linux computers as workers to complete specific tasks marked for completion by their software.

Figure 3:
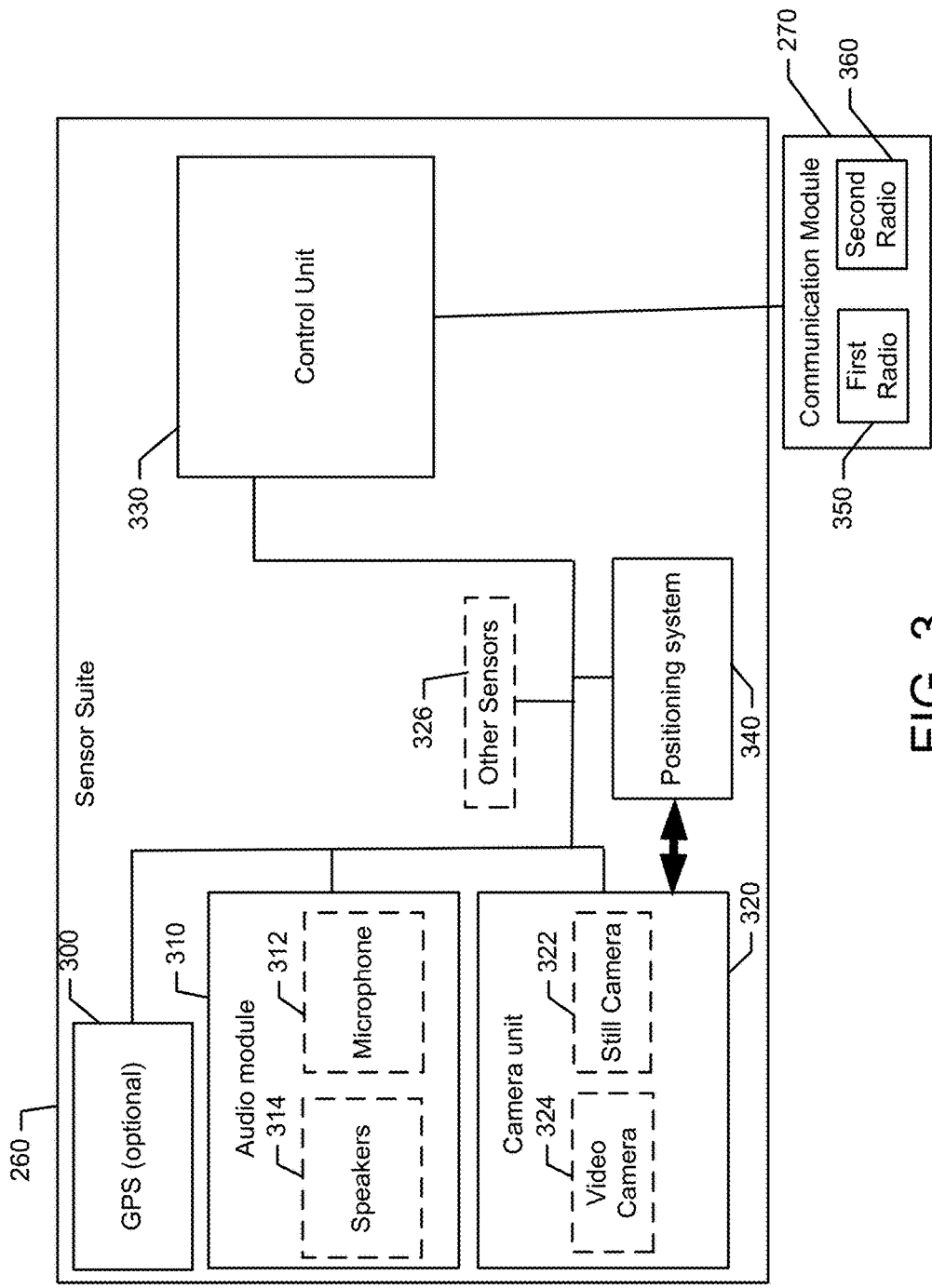
FIG. 3 illustrates a block diagram of a sensor suite of a sensor module in accordance with an example embodiment.

As mentioned above, the sensor module 160 may include any of a plurality of different sensor suites. One example of a sensor suite 260 is shown in FIG. 3. As shown in FIG. 3, the sensor suite 260 of an example embodiment may optionally include a GPS module 300 or other method for geolocation. Although not required, the GPS module 300 (or other geolocation module) may record the position of the IRiS when GPS connectivity is possible.

The sensor suite 260 of some embodiments may also include an audio module 310 and/or a camera module 320, each of which is operably coupled to a control unit 330. The audio module 310 may include a microphone 312 to enable sound to be captured at the sensor suite 260 for storage (e.g., at the control unit 330). The audio module 310 may also include one or more speakers 314 to emit sound into the vicinity of the IRiS. The speakers 314 may be used to emit sound associated with preprogrammed warnings, alarms and/or the like. Alternatively or additionally, audio files may be played from the control unit 330 or other audio may be provided to the sensor suite 260 via the communication module 270 to be emitted by the speakers 314.

The camera unit 320 may include any of a number of different camera modules. For example, in some cases, the camera unit 320 may include a still camera 322 for taking photos in the vicinity of the IRiS. The photos may be conventional (i.e., color) images in the visible light spectrum, or may be images captured in other spectrum or for other types of image (e.g., infrared cameras, thermal imaging cameras, etc.). The camera unit 320 may alternatively or additionally include a video camera 324 capable of capturing any desirable types of video data (e.g., near infrared (NIR) video, color video, and/or the like). In some cases, the camera unit 320 may include memory (e.g., local fixed memory, or removable memory), or the camera unit 320 may provide image data to the control unit 330 for storage of the image data at the control unit 330. The image data may thereafter be analyzed, studied and reviewed by analysts and, in some cases, the analysts may be enabled to click and drag or advance and rewind the image data in a controlled fashion in order to facilitate detailed analysis of the image data. Audio data may also be processed in a similar fashion.

In some cases, the camera unit 320 may include more than one camera of a particular type, with such cameras positioned in corresponding desired directions. For example, cameras may be positioned in front and back of the IRiS and/or to one side or the other. However, in other cases, in addition to using multiple cameras, a positioning system 340 may be employed to enable the cameras to be lifted/lowered or steered/panned/tilted to allow pointing of the cameras in desired directions. Thus, for example, the positioning system 340 may include a servo or electric motor operably coupled to a mast or other support structure upon which the camera(s) are mountable. The positioning system 340 may then be operated under the control of the control unit 330 to steer the camera(s) to desired locations for data gathering. The positioning system 340 may elevate the camera(s) (e.g., using the mast) and/or point the camera(s) to desired locations (e.g., using a 360 degree pan/tilt assembly) based on programmed instructions stored at the control unit 330, or the operator may take real-time control over the positioning system 340 (via wireless communications supported by the communications module 270) to position the camera(s) to the desired locations.

In an example embodiment, one or more other sensors 326 may also be included in the sensor suite 260 to enable the IRiS to perform corresponding functionality associated with the other sensors 326 and payload equipment. The other sensors 326 and payload equipment may include, for example, laser designators, chemical sensors, radiation monitors, laser scanners, fiber optic modems, gas sensors, radar based sensors, light radars (LIDARs), high frequency acoustic sensors, and/or the like. The other sensors 326 and payload equipment may operate under the control of the control unit 330, and may be positionable by operation of the positioning system 340 (if such positioning is desired). In an example embodiment, expansion ports (see expansion ports 328 on FIG. 5C) may be provided to enable various additional modules to be added or connected to the sensor suite 260. The expansion ports 328 may support Ethernet connection, USB, serial connections, fiber optic connections or additional power inputs.

Data gathered by any of the sensors on the sensor suite 260 may be stored at the control unit 330 for communication back to the base station 145 via the communication module 270 either in real-time or on a delayed basis, dependent upon the availability of the first and second communication links 282 and 284 (and tertiary link 286, if employed). As shown in FIG. 3, the communication module 270 may include a first radio 350 and a second radio 360 to facilitate communication with corresponding radios on the communication module 280 of the base station 145. The first radio 350 and the second radio 360 may, for example, be a wireless communication link of any desired type (e.g., a radio operating at 2.4 GHz, 900 MHz or 5.8 GHz). If the tertiary link 286 is employed, a third radio may, in some cases, be a cellular communication radio. Thus, for example, if the first radio 350 and second radio 360 lose connectivity with the base station 145, the third radio may establish the tertiary communication link 286 via a cellular service, and connectivity to the base station 145 may be re-established via a fallback link through the cellular service.

In some example embodiments, either or both of the first and second radios 350 and 360 can be augmented with power amplifiers to boost radio range. The power amplifiers may be provided as part of support equipment carried in the support equipment transporter 170, or may otherwise be carried on the second transport unit 150. By adding or removing power amplifiers, variable powers and ranges can be achievable by the first and second radios 350 and 360.

In some example embodiments, the control unit 330 may be programmed to enable the deployable vehicle 105 to operate in an autonomous mode. In such an example, the control unit 330 may receive input from some of the sensors or other components onboard the deployable vehicle 105 to enable the deployable vehicle 105 to operate without operator control. In such embodiments, for example, the GPS module 300 or other geolocation module (e.g., a rotary encoder for counting wheel revolutions, an accelerometer and/or the like) may provide position information that may be used by the control unit 330 to determine position estimates or movement status for the deployable vehicle 105. Thus, for example, not only could the deployable vehicle 105 detect events such as encountering an obstruction, derailment, or other negative events related to position information, but the deployable vehicle 105 can also compare its location to a pre-programmed route or travel plan to execute the same. The sensors (e.g., laser scanners at the front and/or rear of the deployable vehicle 105) may also assist in detecting obstacles in some cases.

Thus, as can be appreciated from the description above, multiple modes of operation are possible. For example, in some cases, the deployable vehicle 105 may be operated in close proximity to the base station 145 (e.g., when tethered operation or short range wireless communication is employed). In other example embodiments, the deployable vehicle 105 may be operated far distant to the base station 145 (e.g., when longer range wireless communication is employed). In still other examples, autonomous operation of the deployable vehicle 105 may be employed.

Figure 4:
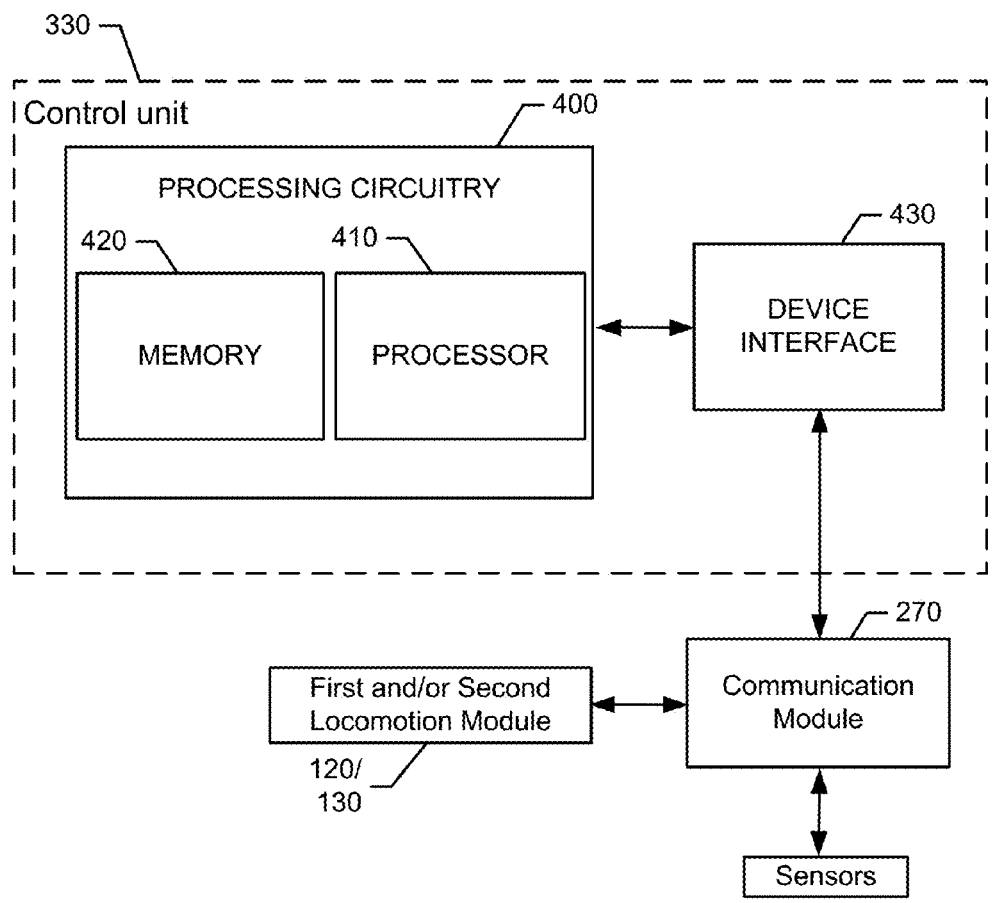
FIG. 4 illustrates a block diagram of one example of processing circuitry associated with execution of an example embodiment.

FIG. 4 illustrates a block diagram of the control unit 330 in accordance with an example embodiment. As shown in FIG. 4, the control unit 330 may include processing circuitry 400 that is configurable to perform actions in accordance with example embodiments described herein. As such, for example, at least some of the functions attributable to the control unit 330 (and/or entities/components thereof) may be carried out by or otherwise instructed by the processing circuitry 400. The processing circuitry 400 may therefore provide the hardware for hosting software to configure the system for module control and implementation of monitoring, analysis and/or control techniques consistent with example embodiments.

The processing circuitry 400 may be configured to perform data processing, control function execution and/or other processing and management services according to an example embodiment of the present invention. In some embodiments, the processing circuitry 400 may be embodied as a chip or chip set. In other words, the processing circuitry 400 may comprise one or more physical packages (e.g., chips) including materials, components and/or wires on a structural assembly (e.g., a baseboard).

In an example embodiment, the processing circuitry 400 may include one or more instances of a processor 410 and memory 420 that may be in communication with or otherwise control a device interface 430. As such, the processing circuitry 400 may be embodied as a circuit chip (e.g., an integrated circuit chip) configured (e.g., with hardware, software or a combination of hardware and software) to perform operations described herein. Moreover, in some cases, the processing circuitry 400 could be embodied as a virtual machine (VM) within another computer.

The device interface 430 may include one or more interface mechanisms for enabling communication with other external devices (e.g., output devices, input devices, and/or the like) or the modules/components of the IRiS. In some cases, the device interface 430 may be any means such as a device or circuitry embodied in either hardware, or a combination of hardware and software that is configured to receive and/or transmit data from/to devices and/or modules in communication with the processing circuitry 400. Thus, the device interface 430 may enable the processor 410 to communicate with the communication module 270 and/or other modules/units/sensors of the IRiS as shown in FIG. 4. In some cases, the control unit 330 may also communicate (via the device interface 430) with the first and second locomotion modules 120 and 130 to control movement of the first and second locomotion modules 120 and 130 via instructions received wirelessly from the base station 145.

In an exemplary embodiment, the memory 420 may include one or more non-transitory memory devices such as, for example, volatile and/or non-volatile memory that may be either fixed or removable. The memory 420 may be configured to store information, data, applications, instructions or the like for enabling the processing circuitry 400 to carry out various functions in accordance with example embodiments. For example, the memory 420 could be configured to buffer input data for processing by the processor 410. Additionally or alternatively, the memory 420 could be configured to store instructions for execution by the processor 410. As yet another alternative, the memory 420 may include one or more databases that may store image data, audio data, images, and/or the like that have been captured by components of the IRiS to be employed for the execution of example embodiments. In some cases, the data sets may also or alternatively store instructions for generation of maps that reconstruct the environment traversed by the IRIS. However, it should be appreciated that the processing of data for map generation could alternatively be performed by a separate computer system (e.g., at or in communication with the base station 145) receiving raw or processed data from the IRiS in some embodiments. Among the contents of the memory 420, applications may be stored for execution by the processor 410 in order to carry out the functionality associated with each respective application. In some cases, the applications may include directions for control of the processing circuitry 400 to enable data to be processed and/or maps to be generated. In some embodiments, the maps may further be annotated via the processing circuitry 400 in order to correlate data gathered via the sensors with corresponding locations at which the data was gathered.

The processor 410 may be embodied in a number of different ways. For example, the processor 410 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 410 may be configured to execute instructions stored in the memory 420 or otherwise accessible to the processor 410. As such, whether configured by hardware or by a combination of hardware and software, the processor 410 may represent an entity (e.g., physically embodied in circuitry—in the form of processing circuitry 400) capable of performing operations according to embodiments of the present invention while configured accordingly. Thus, for example, when the processor 410 is embodied as an ASIC, FPGA or the like, the processor 410 may be specifically configured hardware for conducting the operations described herein. Alternatively, as another example, when the processor 410 is embodied as an executor of software instructions, the instructions may specifically configure the processor 410 to perform the operations described herein.

In an example embodiment, the processor 410 (or the processing circuitry 400) may be embodied as, include or otherwise control the modules of the IRiS. As such, in some embodiments, the processor 410 (or the processing circuitry 400) may be said to cause each of the operations described in connection with the modules of the IRiS to undertake the corresponding functionalities responsive to execution of instructions or algorithms configuring the processor 410 (or processing circuitry 400) accordingly.

Of note, the base station 145 may include a control unit substantially similar to that of FIG. 4 except that the control unit of the base station 145 may further include the user interface 295. However, it should be noted that the control unit of the base station 145 could actually be the control unit of the user interface 295 in some cases. Regardless, the memory of the base station 145 (or user interface 295) may store data gathered by the vehicle 105 and communicated back to the base station 145. In some cases, both the vehicle 105 and the base station 145 may store the gathered data simultaneously.

FIG. 5, which includes FIGS. 5A, 5B and 5C, illustrates a series of steps showing one example structure for implementing IRiS in accordance with an example embodiment. As shown in FIG. 5A, the first locomotion module 120 may be setup so that both the rail wheels 222 of the mobility assembly 220 is aligned with the track 500. Portions of the frame 230 are shown folded against a body 510 of the first locomotion module 120. The motor 210 and power source 200 of the first locomotion module 120 may be housed within the body 510, and are therefore not visible in FIG. 5A.

The portion of the frame 230 that is attached to the first locomotion module 120 may be extended and operably coupled to a corresponding extended portion of the frame 230 that is attached to the second locomotion module 130, as shown in FIG. 5B. After the frame 230 is fully assembled, the sensor module 160 may be installed onto the frame 230. As mentioned above, clamps may secure the portions of the frame 230 together and the sensor module 160 to the frame 230. All electrical connections are also made by virtue of the installation of the sensor module 160 onto the frame 230.

FIG. 6 illustrates a deployed IRiS in accordance with an example embodiment. As shown in FIG. 6, the IRiS is deployed on track 500 with the sensor module 160 ready for data collection and ready for remote communication. In this regard, the camera unit 320 is provided with a plurality of cameras including a visible/NIR camera 600, a laser designator 605 and a thermal camera 610 mounted on an extendable telescoping mast 615 (e.g., an eight foot mast). The camera unit 320 also includes a visible spotlight 620 and an NIR spotlight 630 supported on the mast 615 via a 360 degree pan/tilt unit 640. A directional microphone 650 is also mounted on the mast 615. As can be seen in FIG. 6, an antenna assembly 660 is also provided to support antennas for communication of the first radio 350 and second radio 360 of FIG. 3.

As mentioned above, the base station 145 is mobile and can be carried to a deployed location on the back of the operator in a backpack. Once on scene, the base station 145 can be transitioned into a stationary configuration 700 as shown in FIG. 7A. However, as an alternative, the base station 145 could be worn on the back of the operator while operating when in a mobile configuration 710 as shown in FIG. 7B. In either case, the operator can remove the user interface 295 and hold the user interface 295 while walking with the base station 145 in either the mobile configuration 710 or the stationary configuration 700.

Example embodiments may provide a highly portable system that is capable of providing a large amount of operational time to make it easy to access any location and obtain highly accurate information for status, safety and security monitoring. In some cases, multiple cameras may be operated together so that side-by-side images can be replayed to offer simultaneous images (e.g., visible and thermal) for analysis. Safety and security operations can therefore be supported with forensic evidence for accident investigations, criminal investigations, security breach investigations and/or the like using side-by-side video in multiple different spectra. The user interface may be flexible and mobile, and the communications may be highly reliable and redundant. The IRiS may be customizable for special missions due to the ability to carry specialized and interchangeable payloads. Batteries employed may be high capacity (e.g., lithium ion) batteries that are rechargeable.

The locomotion modules may also be provided with emergency stop switches, front and/or rear running lights and manual radio attenuator switches to enable radiofrequency (RF) transmit power reduction.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A deployable vehicle of an instrumented rail system, the vehicle comprising:
    a first locomotion module having a first mobility assembly configured to engage a first rail;
    a second locomotion module having a second mobility assembly configured to engage a second rail;
    an adjustable frame extendable between the first and second locomotion modules by a distance corresponding to the distance between the first and second rails; and
    a sensor module removably attachable to the frame, the sensor module including a sensor suite having a plurality of sensors for gathering data while the vehicle is deployed, the sensor module comprising a communications module having a first radio configured to enable the vehicle to establish at least a first wireless communication link with a remotely located mobile base station,
    wherein the communications module further includes a second radio configured to establish a second wireless communication link with the remotely located mobile base station,
    wherein the first and second locomotion modules are configured to be transported by an operator to a deployment location, via a first transport unit, for unmanned deployment of the deployable vehicle, and
    wherein the sensor module is configured to be transported by the operator to the deployment location, via a second transport unit, for the unmanned deployment.

2. The vehicle of claim 1, wherein the sensor suite comprises a camera unit.

3. The vehicle of claim 2, wherein the camera unit is operably coupled to a positioning system configured to reposition the camera unit relative to the vehicle.

4. The vehicle of claim 3, wherein the positioning system comprises an extendable mast or a pan/tilt unit.

5. The vehicle of claim 2, wherein the camera unit comprises one or more of a visible light camera, a thermal imaging camera, a near infrared camera.

6. The vehicle of claim 5, wherein the camera unit further comprises a visible spotlight or a near infrared spotlight.

7. The vehicle of claim 1, wherein the sensor module further comprises an audio module comprising a directional microphone or speakers.

8. The vehicle of claim 1, wherein the second wireless communication link is maintained simultaneously with the first wireless communication link or in response to a loss of the first wireless communication link.

9. The vehicle of claim 1, wherein the sensor suite is one of a selected number of different sensor suites having corresponding different sensors to enable the sensor module to be replaced with another sensor module having a different one of the different sensor suites.

10. An instrumented rail system, the system comprising:
a mobile base station; and
a deployable vehicle, the deployable vehicle comprising:
a first locomotion module having a first mobility assembly configured to engage a first rail;
a second locomotion module having a second mobility assembly configured to engage a second rail;
an adjustable frame extendable between the first and second locomotion modules by a distance corresponding to the distance between the first and second rails; and
a sensor module removably attachable to the frame, the sensor module including a sensor suite having a plurality of sensors for gathering data while the vehicle is deployed, the sensor module comprising a communications module having a first radio configured to enable the vehicle to establish at least a first wireless communication link with the mobile base station,
wherein the communications module further includes a second radio configured to establish a second wireless communication link with the mobile base station,
wherein the first and second locomotion modules are configured to be transported by an operator to a deployment location, via a first transport unit, for unmanned deployment, and
wherein the sensor module is configured to be transported by the operator to the deployment location, via a second transport unit, for the unmanned deployment.

11. The system of claim 10, wherein the sensor suite is one of a selected number of different sensor suites having corresponding different sensors to enable the sensor module to be replaced with another sensor module having a different one of the different sensor suites.

12. The system of claim 10, wherein the first and second locomotion modules are configured to be transported by a first operator, wherein the sensor module is configured to be transported by a second operator, the first and second operators being different.

13. The system of claim 12, wherein the mobile base station is configured to be transported by either the first or second operator via a backpack.

14. The system of claim 10, wherein the mobile base station comprises a second communication module including radios corresponding to the first and second radios, and wherein the mobile base station further comprises a removable user interface configured to operably couple to the mobile base station wirelessly.

15. The system of claim 14, wherein the removable user interface comprises a tablet.

16. The system of claim 10, wherein each of the mobile base station and the vehicle include a control unit, and wherein the control unit of each of the mobile base station and the vehicle simultaneously record data captured by the sensor suite.

17. The system of claim 10, wherein the first radio or the second radio can be modified while deployed to change range characteristics of the first radio or second radio.

18. The system of claim 10, wherein the sensor suite comprises a camera unit operably coupled to a positioning system configured to reposition the camera unit relative to the vehicle.

19. The system of claim 18, wherein the positioning system comprises an extendable mast or a pan/tilt unit, wherein the camera unit comprises one or more of a visible light camera, a thermal imaging camera, a near infrared camera, and wherein the camera unit further comprises a visible spotlight or a near infrared spotlight.

20. The system of claim 10, wherein the deployable vehicle is configured to be autonomously operated based on onboard sensors and control logic, or operate through tethered operation via a wire or fiber optic cable connection to the base station.

* * * * *